United States Patent
Min et al.

(10) Patent No.: US 10,531,394 B2
(45) Date of Patent: Jan. 7, 2020

(54) MOBILE TERMINAL AND CONTROLLING METHOD THEREOF

(71) Applicant: LG ELECTRONICS INC., Seoul (KR)

(72) Inventors: Heajung Min, Seoul (KR); Jintae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/503,044

(22) PCT Filed: Jul. 10, 2015

(86) PCT No.: PCT/KR2015/007190
§ 371 (c)(1),
(2) Date: Feb. 10, 2017

(87) PCT Pub. No.: WO2016/024723
PCT Pub. Date: Feb. 18, 2016

(65) Prior Publication Data
US 2017/0245212 A1     Aug. 24, 2017

(30) Foreign Application Priority Data

Aug. 12, 2014    (KR) ........................ 10-2014-0104402

(51) Int. Cl.
*H04B 1/38*     (2015.01)
*H04W 52/02*    (2009.01)
*G06F 3/0488*   (2013.01)

(52) U.S. Cl.
CPC ...... *H04W 52/028* (2013.01); *G06F 3/04883* (2013.01); *H04W 52/027* (2013.01);
(Continued)

(58) Field of Classification Search
CPC .... G06F 1/3262; G06F 1/3265; G06F 3/0488; G06F 3/04883; H04M 2250/22;
(Continued)

(56) References Cited

U.S. PATENT DOCUMENTS

2011/0080349 A1*   4/2011   Holbein ................ G06F 1/3203
                                                        345/173
2014/0253326 A1*   9/2014   Cho ........................ G08B 25/10
                                                        340/539.13
(Continued)

FOREIGN PATENT DOCUMENTS

KR    10-2010-0081575 A    7/2010
KR    10-2012-0005124 A    1/2012
(Continued)

*Primary Examiner* — Xin Jia
(74) *Attorney, Agent, or Firm* — Birch, Stewart, Kolasch & Birch, LLP

(57) ABSTRACT

A mobile terminal and controlling method thereof are disclosed, by which a touch sensitivity of a display unit can be improved. The present invention includes a display unit, a touch sensor configured to detect a touch input applied to the display unit by periodically waking up while the display unit is turned off, and a controller, if a preset user input is received, controlling a wakeup period of the touch sensor distributed in at least one partial region of the display unit to be decreased.

8 Claims, 10 Drawing Sheets

(52) U.S. Cl.
CPC .... *H04W 52/0254* (2013.01); *H04M 2250/22* (2013.01); *Y02D 70/00* (2018.01)

(58) Field of Classification Search
CPC ......... H04W 52/0254; H04W 52/0267; H04W 52/027; H04W 52/028
See application file for complete search history.

(56) References Cited

U.S. PATENT DOCUMENTS

| | | | | |
|---|---|---|---|---|
| 2014/0273995 | A1* | 9/2014 | Kim | H04M 3/42365 455/414.1 |
| 2014/0310788 | A1* | 10/2014 | Ricci | B60Q 1/00 726/6 |
| 2014/0340350 | A1* | 11/2014 | Chen | G06F 1/3262 345/174 |
| 2015/0026623 | A1* | 1/2015 | Horne | G06F 3/04847 715/771 |
| 2015/0042572 | A1* | 2/2015 | Lombardi | G09G 3/3208 345/173 |

FOREIGN PATENT DOCUMENTS

| | | |
|---|---|---|
| KR | 10-2013-0070378 A | 6/2013 |
| KR | 10-2013-0081673 A | 7/2013 |

\* cited by examiner

[Fig. 1A]
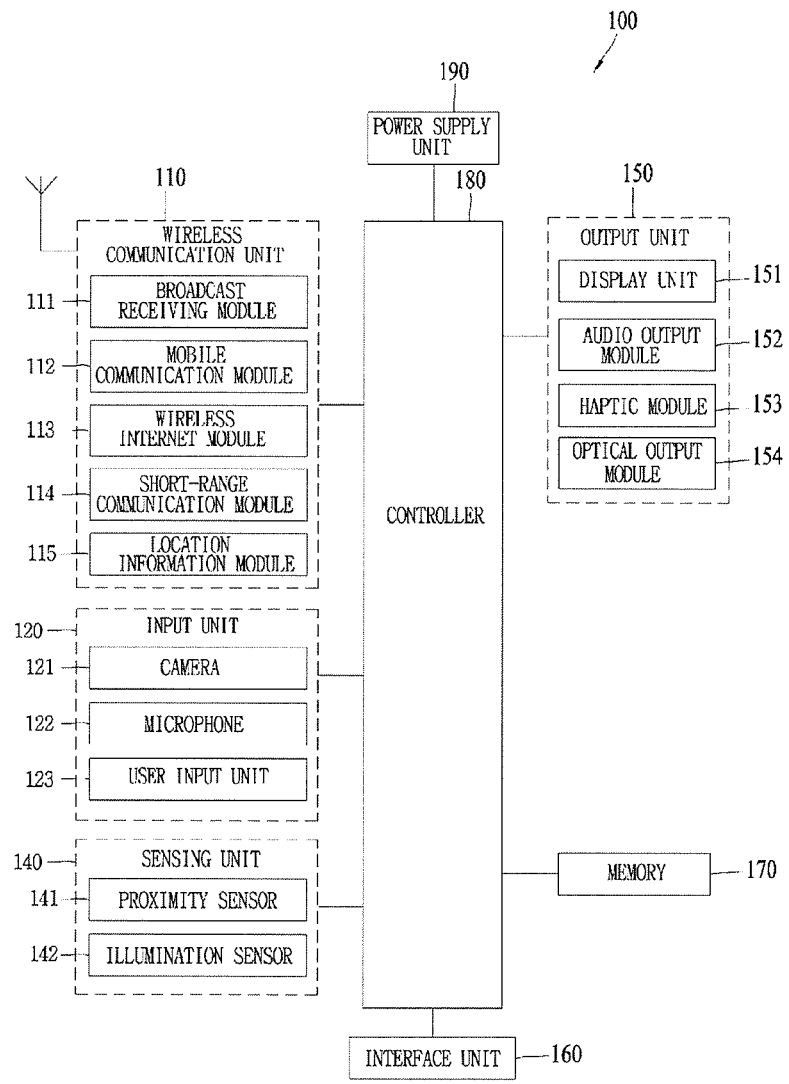
[Fig. 1B]
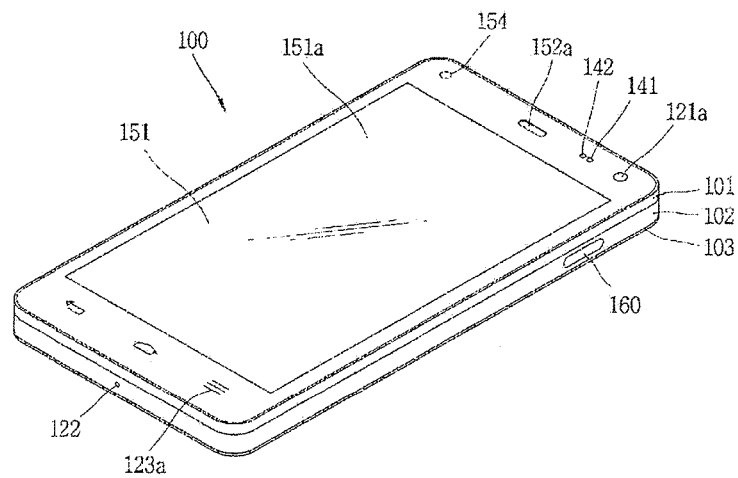

[Fig. 1c]
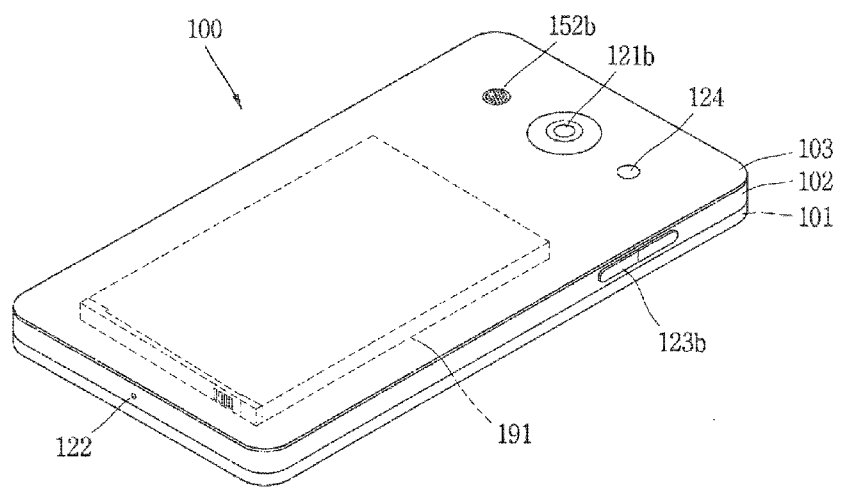

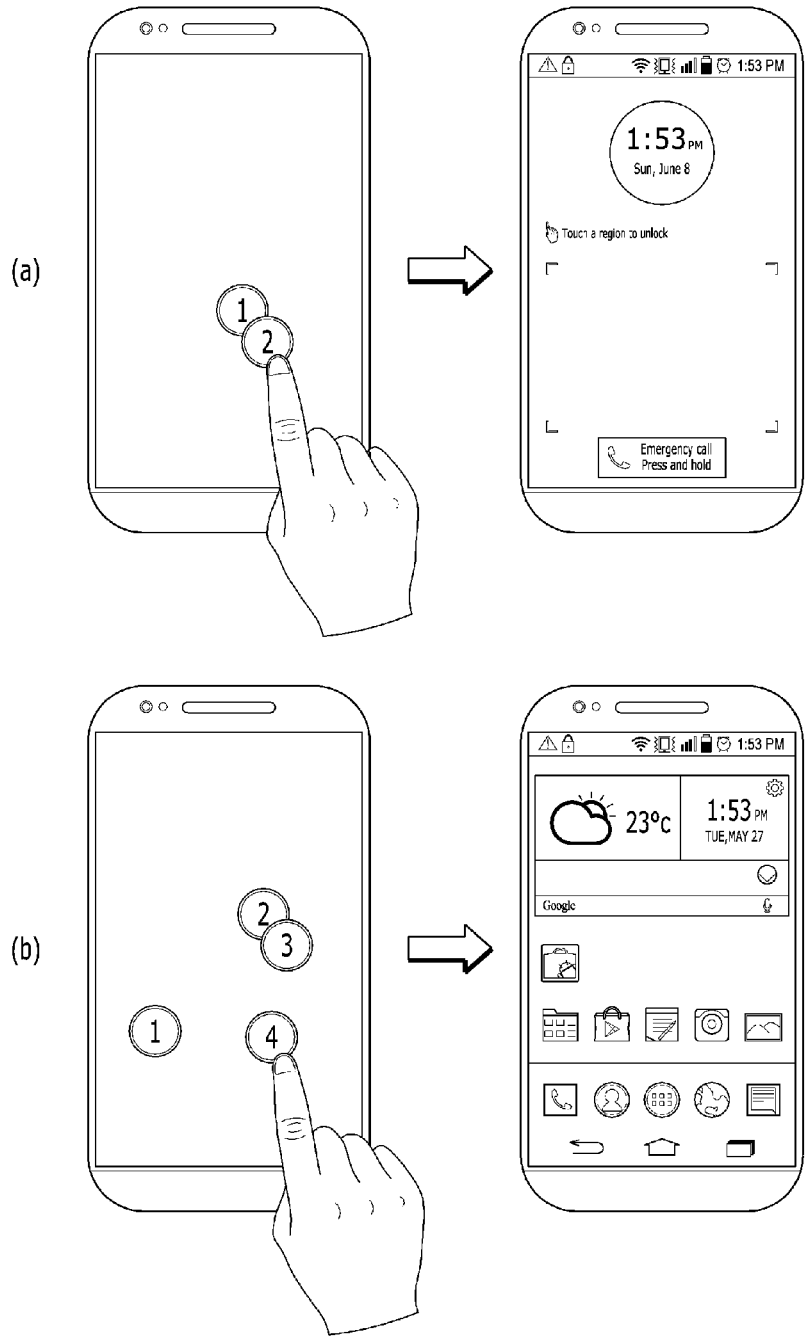
[Fig. 2]

[Fig. 3A]
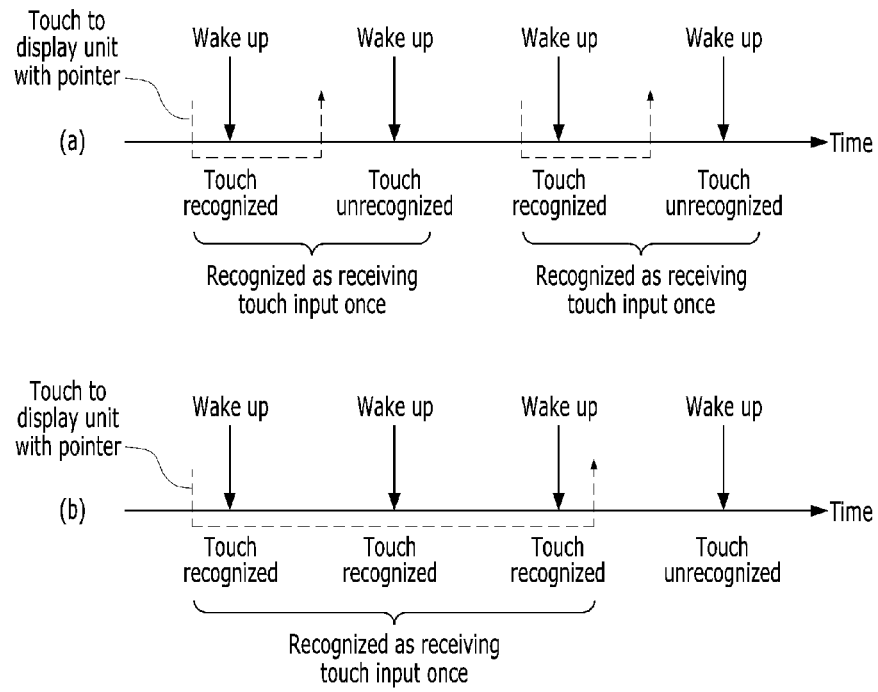
[Fig. 3B]
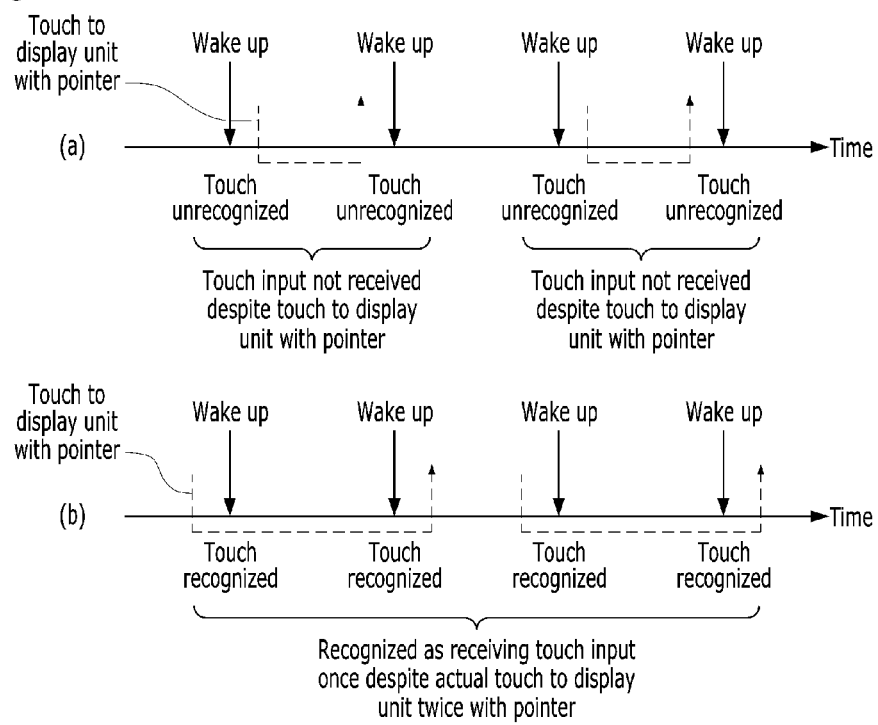

[Fig. 4]
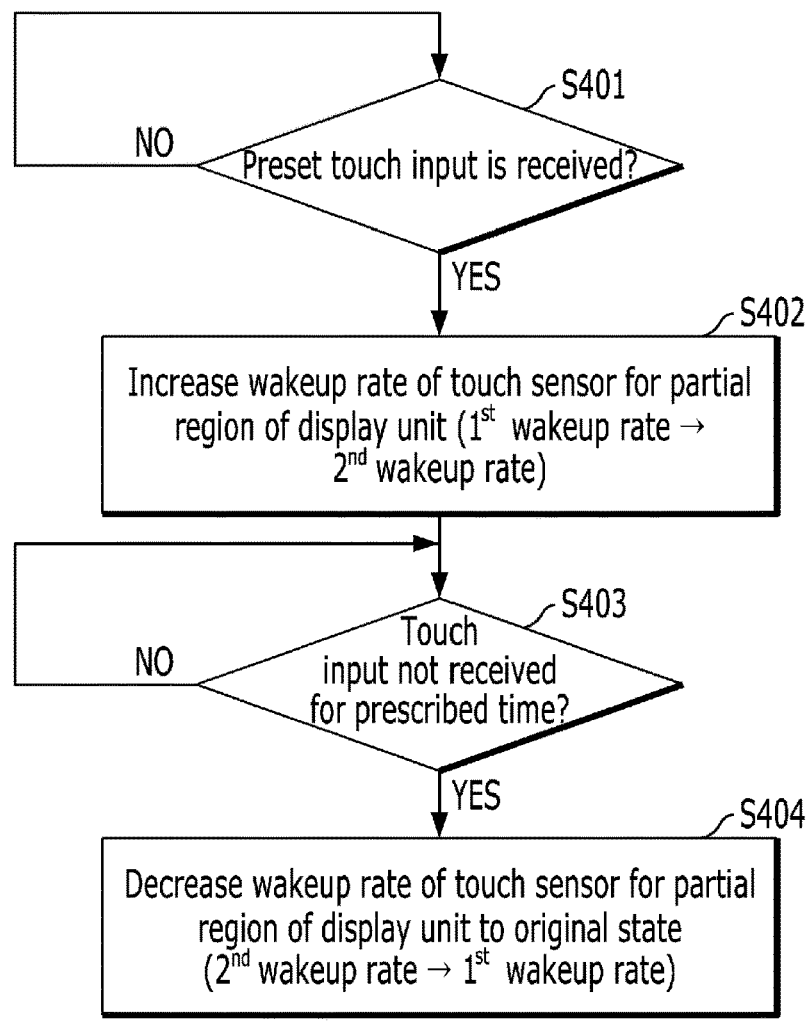
[Fig. 5]
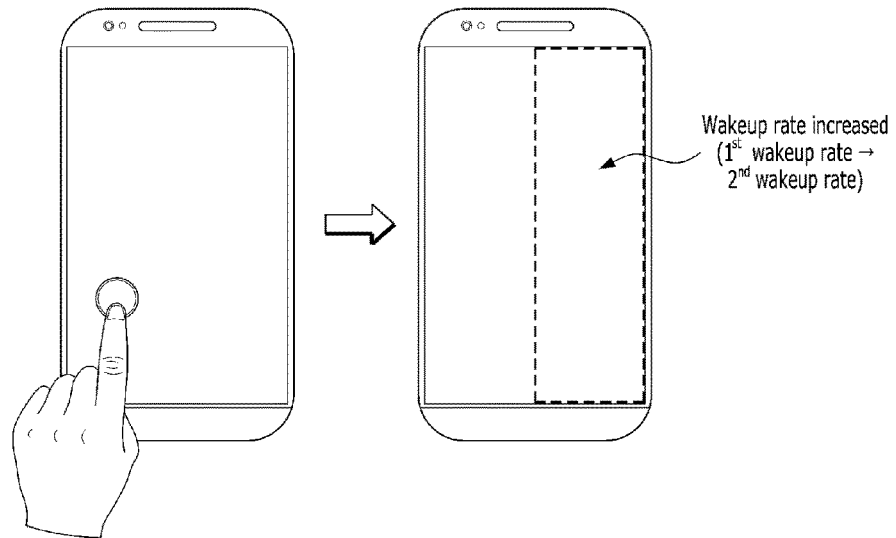

[Fig. 6]
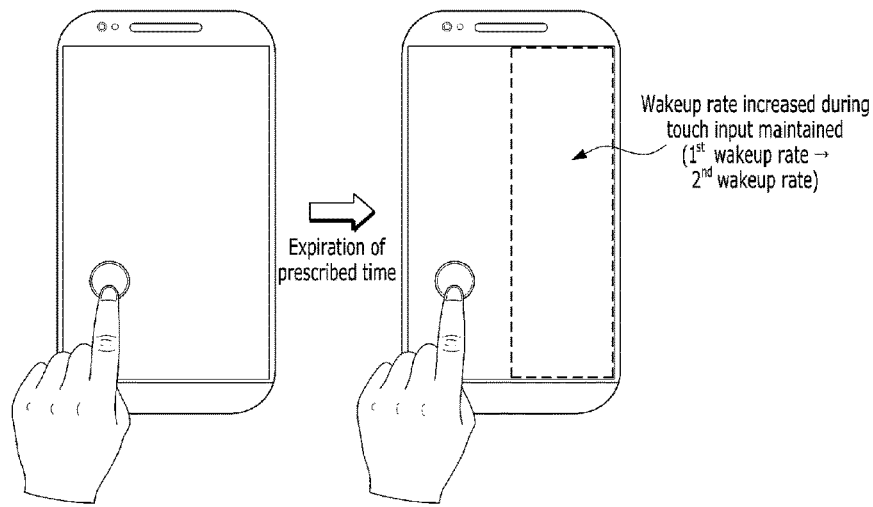
[Fig. 7A]
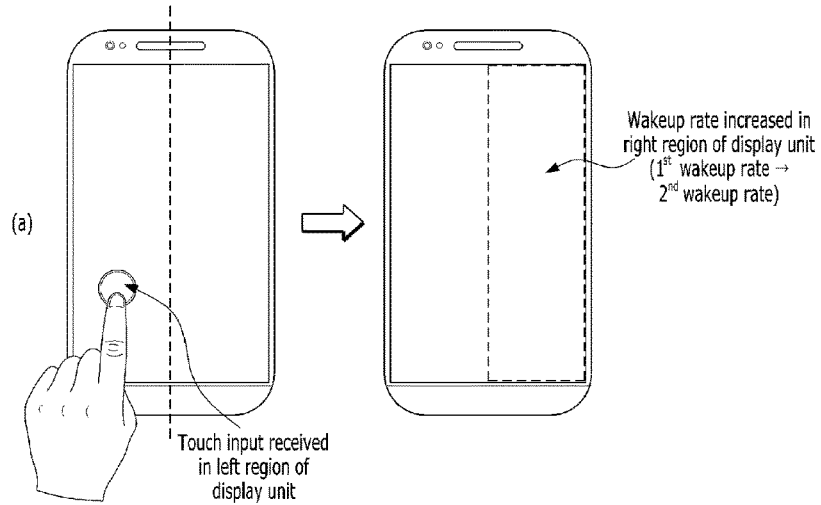
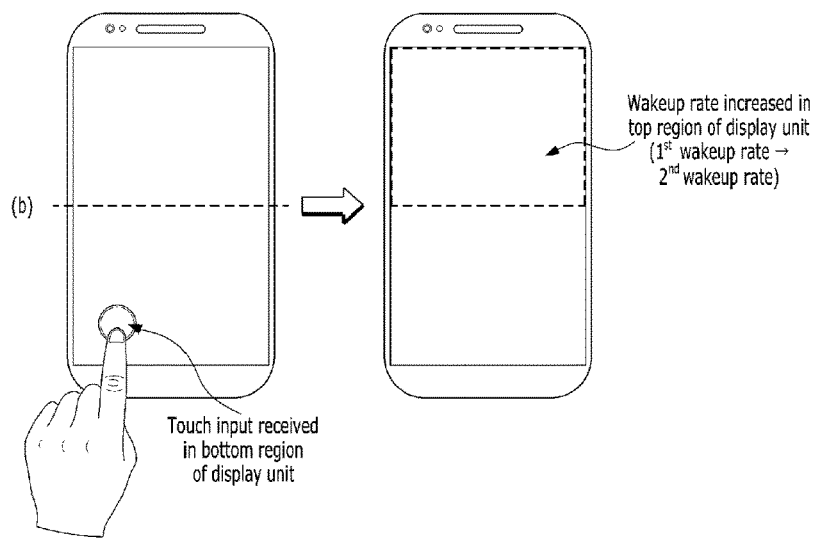

[Fig. 7B]
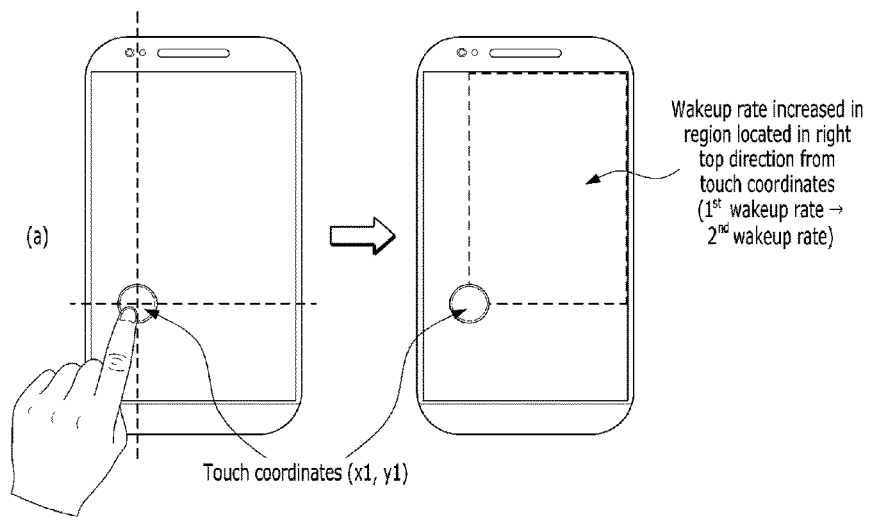
[Fig. 7C]
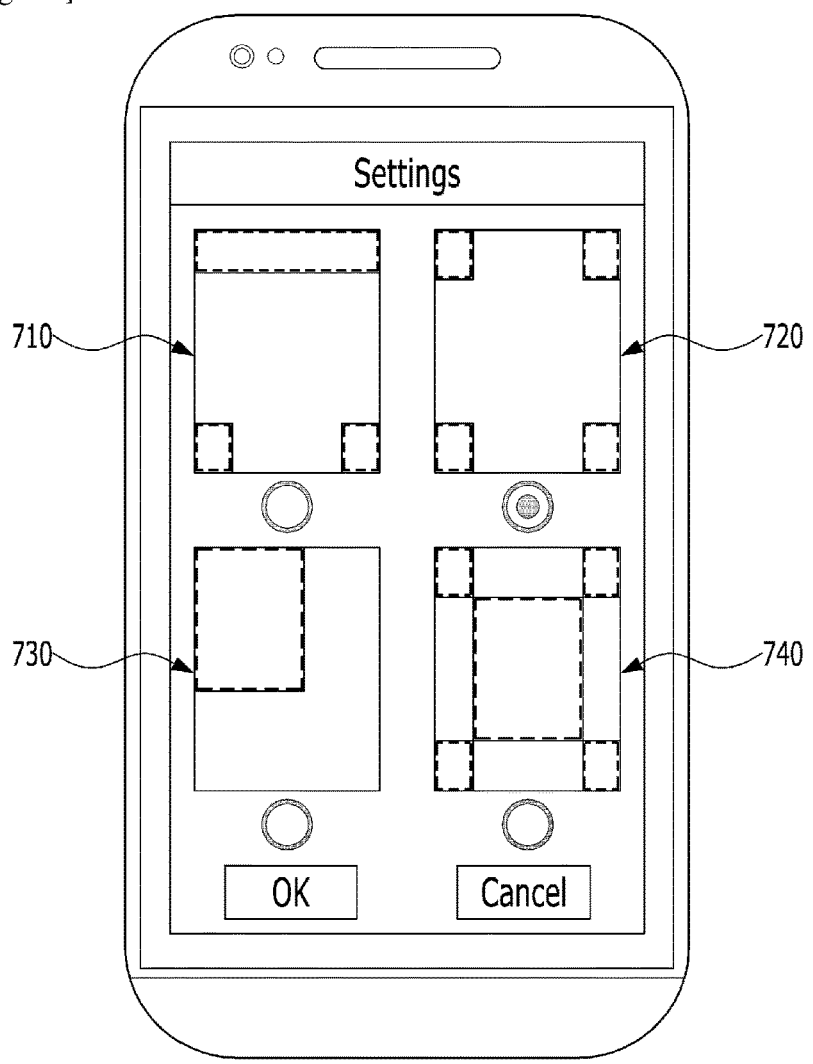

[Fig. 8]
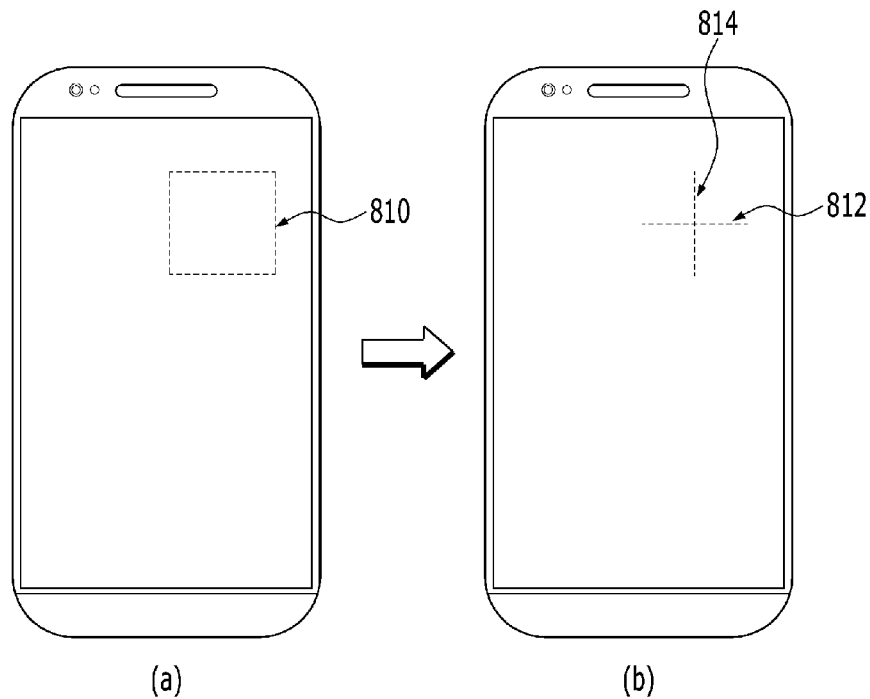
[Fig. 9]
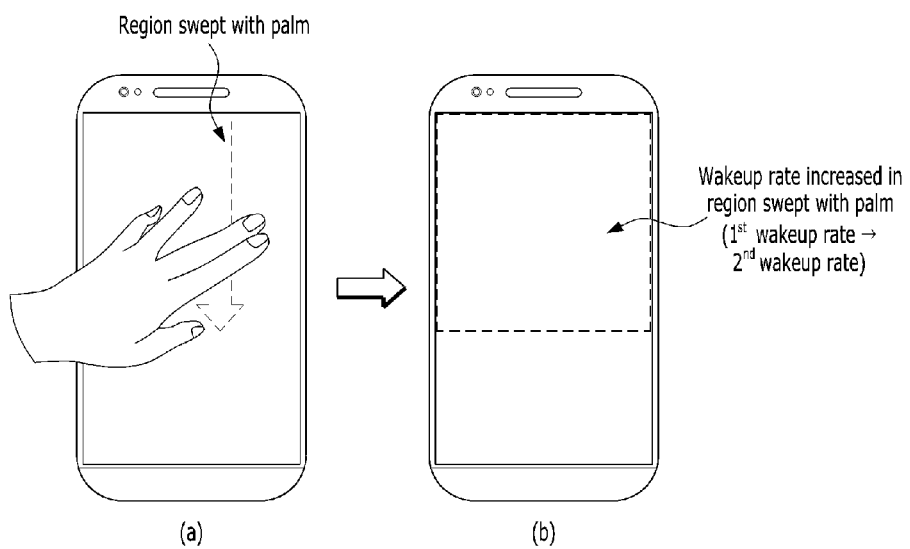

[Fig. 10]
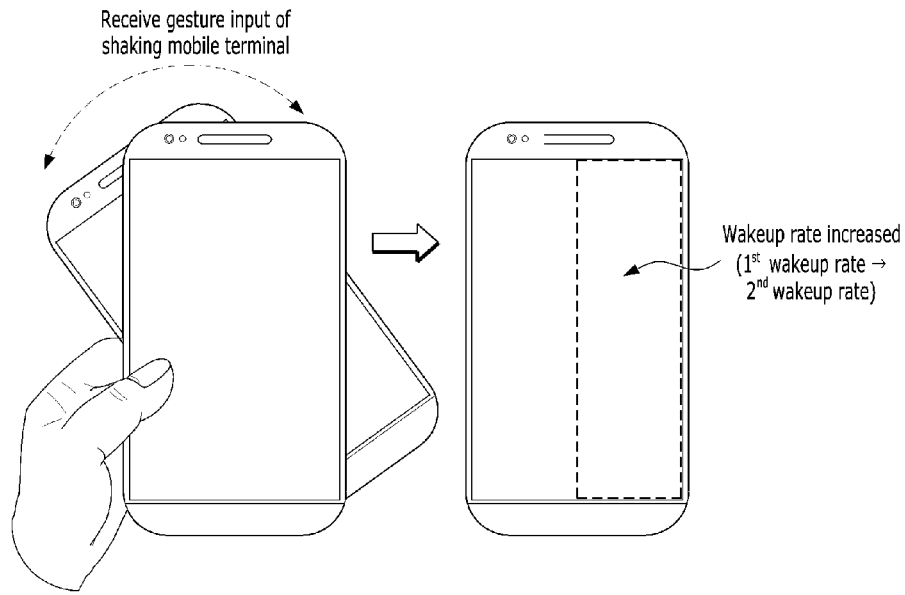
[Fig. 11]
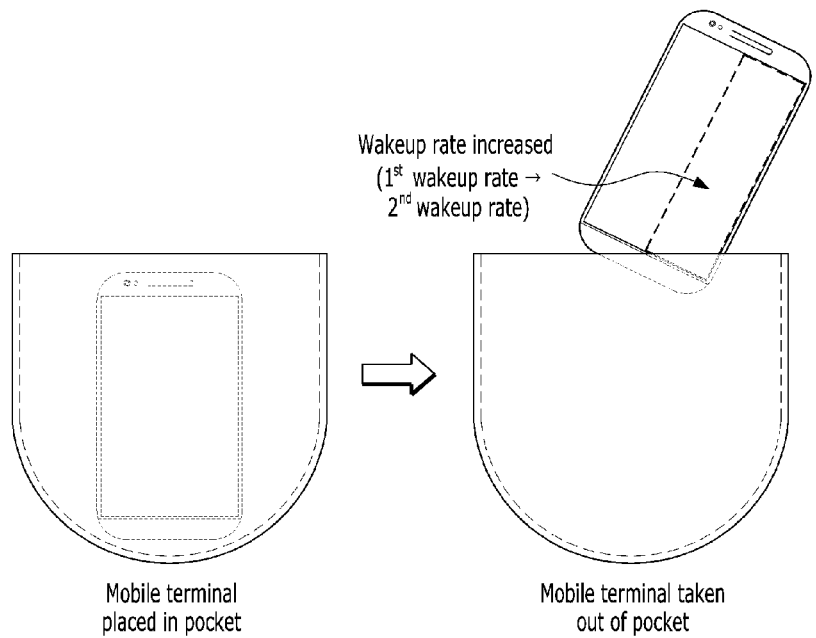

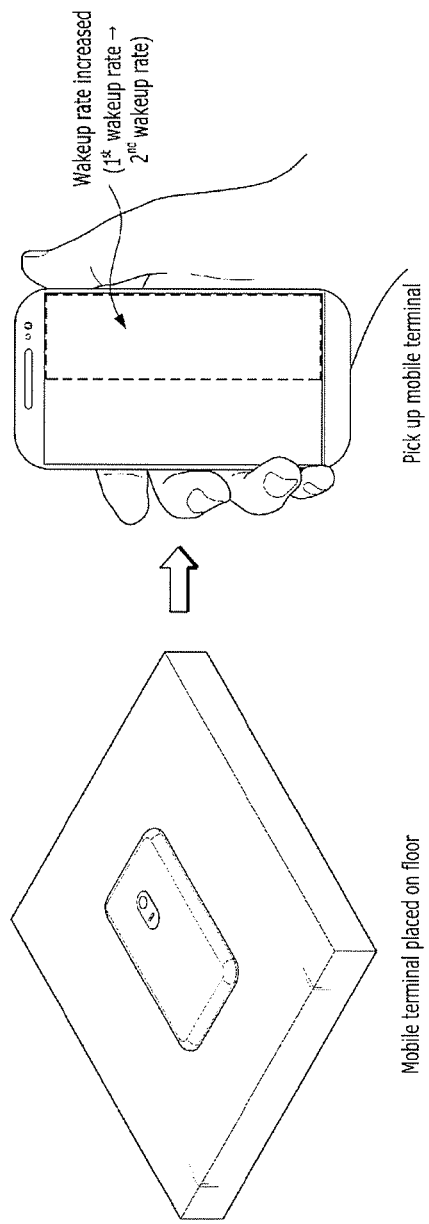

MOBILE TERMINAL AND CONTROLLING METHOD THEREOF

CROSS REFERENCE TO RELATED APPLICATIONS

This application is the National Phase of PCT International Application No. PCT/KR2015/007190, filed on Jul. 10, 2015, which claims priority under 35 U.S.C. 119(a) to Patent Application No. 10-2014-0104402, filed in the Republic of Korea on Aug. 12, 2014, all of which are hereby expressly incorporated by reference into the present application.

TECHNICAL FIELD

The present invention relates to a mobile terminal, and more particularly, to a mobile terminal and controlling method thereof. Although the present invention is suitable for a wide scope of applications, it is particularly suitable for enhancing touch detection sensitivity of a display unit.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Recently, a mobile terminal employs a touchscreen in general. If so, a user is able to manipulate a mobile terminal by touching information displayed on a display unit. Therefore, a user of the mobile terminal can be provided with an authorized user interface and convenience in using the mobile terminal.

Yet, in order to prevent a user from inputting an incorrect input in case of using a touchscreen, when a user intends not to use a mobile terminal, it is preferable that the mobile terminal is maintained in touch lock state. As a mobile terminal enters a power saving mode, although a display unit is turned off, it is preferable that the display unit is maintained in touch lock state.

Recently, although a display unit is turned off, an attempt to receive a touch input is performed. For example, while a display unit is turned off, if a preset input is received, a power saving mode of a mobile terminal is cancelled and the display unit is then turned off in general.

While a power saving mode of a mobile terminal is maintained, in order to power consumption of the mobile terminal, it is necessary for sensitivity of a touch sensor to be maintained at a low level. However, if the sensitivity of the touch sensor is lowered, it may run the risk of failing to receive a touch input according to user's intention. Thus, the present invention intends to disclose a mobile terminal capable of enhancing sensitivity of a touch sensor if necessary.

SUMMARY OF THE INVENTION

Accordingly, the present invention is directed to a mobile terminal and controlling method thereof that substantially obviate one or more of the problems due to limitations and disadvantages of the related art.

One object of the present invention is to provide a mobile terminal and controlling method thereof, by which user's convenience is enhanced.

In particular, the object of the present invention is to provide a mobile terminal and controlling method thereof, by which sensitivity of a touch sensor can be raised in a state that a display unit is turned off.

Technical tasks obtainable from the present invention are non-limited by the abovementioned technical tasks. And, other unmentioned technical tasks can be clearly understood from the following description by those having ordinary skill in the technical field to which the present invention pertains.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a mobile terminal according to one embodiment of the present invention includes a display unit, a touch sensor configured to detect a touch input applied to the display unit by periodically waking up while the display unit is turned off, and a controller, if a preset user input is received, controlling a wakeup period of the touch sensor distributed in at least one partial region of the display unit to be decreased.

To further achieve these and other advantages and in accordance with the purpose of the present invention, as embodied and broadly described, a method of controlling a mobile terminal according to another embodiment of the present invention includes the steps of detecting a touch input of touching a display unit through a touch sensor while the display unit is turned off, receiving a preset user input through the display unit, and if the preset user input is received, decreasing a wakeup period of the touch sensor distributed in at least one partial region of the display unit.

It is to be understood that both the foregoing general description and the following detailed description are exemplary and explanatory and are intended to provide further explanation of the invention as claimed.

ADVANTAGEOUS EFFECTS OF INVENTION

Accordingly, the present invention provides the following effects and/or features.

First of all, according to one embodiment of the present invention, it is advantageous in that user's convenience can be enhanced.

Particularly, according to one embodiment of the present invention, it is advantageous in that sensitivity of a touch sensor can be raised in a state that a display unit is turned off.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF DRAWINGS

The present invention will become more fully understood from the detailed description given herein below and the accompanying drawings, which are given by illustration only, and thus are not limitative of the present invention, and wherein:

FIG. 1A is a block diagram of a mobile terminal in accordance with the present disclosure;

FIGS. 1B and 1C are conceptual views of one example of the mobile terminal, viewed from different directions;

FIG. 2 is a diagram for one example of cancelling a power saving mode of a mobile terminal in response to a touch input received in a power saving mode state of the mobile terminal;

FIG. 3A is a diagram for one example of normally recognizing a touch input;

FIG. 3B is a diagram for one example of misrecognizing a touch input;

FIG. 4 is a flowchart for an operation of a mobile terminal according to the present invention;

FIG. 5 is a diagram for one example of increasing a wakeup rate of a touch sensor distributed on at least one partial region of a whole region of a display unit according to one embodiment of the present invention;

FIG. 6 is a diagram for another example of increasing a wakeup rate of a touch sensor distributed on at least one portion of a full region of a display unit according to one embodiment of the present invention;

FIGS. 7A to 7C are diagrams for examples of determining a region for increasing a wakeup rate according to one embodiment of the present invention;

FIG. 8 is a diagram for one example of identifiably displaying a wakeup rate increased region according to one embodiment of the present invention;

FIG. 9 is a diagram for further example of increasing a wakeup rate of a touch sensor distributed on at least one partial region of a full region of a display unit according to one embodiment of the present invention;

FIG. 10 is a diagram for one example of increasing a wakeup rate of a touch sensor distributed on at least one partial region of a full region of a display unit in response to a gesture input according to one embodiment of the present invention;

FIG. 11 is a diagram for one example of increasing a wakeup rate of a touch sensor for at least one partial region of a display unit in case of taking a mobile terminal out of a dark place to a bright place according to one embodiment of the present invention; and FIG. 12 is a diagram for one example of increasing a wakeup rate of a touch sensor for at least one partial region of a display unit in case of disappearance of an object proximate to a mobile terminal according to one embodiment of the present invention.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

For clarity and convenience of the following description, assume that a mobile terminal 100 mentioned in the following description includes at least one of the components shown in FIG. 1. For instance, assume that the mobile terminal 100 according to the present invention includes the sensing unit 140, the display unit 151 and the controller 180.

Assume that the display unit 151 of the present invention is a touchscreen configuring a mutual layer structure with a touch sensor. Moreover, although a power of the mobile terminal 100 is turned on, a state that the display unit 151 is turned off shall be named 'power saving mode'. And, a state that both of the power of the mobile terminal 100 and the display unit 151 are turned on shall be named 'normal mode'.

While the mobile terminal 100 is operating in normal mode, the display unit 151 may receive a touch input. In particular, based on one of a detection of a pressure applied to the display unit 151 through a touch sensor, a detection of variation of static electricity of the display unit and the like, the controller 180 can determine whether a user's touch input is received.

While the mobile terminal 100 is operating in power saving mode, a touch input may be received. Based on a touch input received during the operation of the mobile terminal in the power saving mode, the controller 180 can cancel the power saving mode of the mobile terminal 100.

For instance, FIG. 2 is a diagram for one example of cancelling a power saving mode of a mobile terminal in response to a touch input received in a power saving mode state of the mobile terminal according to one embodiment of the present invention. In FIG. 2, the number of circles indicates a count of tapping on the display unit 151. And, a numeral in the circle may indicate an order of tapping on the display unit 151.

Referring to FIG. 2, while the mobile terminal 100 is operating in power saving mode, if a touch input of tapping on the display unit 151 with a pointer twice is received, the controller 180 can control the power saving mode of the mobile terminal 100 to be ended. As the power saving mode of the mobile terminal 100 is ended, the display unit 151 can be turned on [refer to FIG. 2 (a)]. In doing so, if a password is currently set on the mobile terminal 100, the controller 180 may control a lock screen, to which the password for unlocking the mobile terminal 100 (i.e., cancelling a lock of the mobile terminal 100), to be displayed.

By combining a count of tapping on the display unit 151, a location of tapping on the display unit 151 and a sequence of tapping on the display unit 151 together, the password of the mobile terminal can be set up. In doing so, by comparing a touch pattern applied to the display unit 151 with the set password, the controller 180 may be able to determine whether to unlock the mobile terminal 100.

While the mobile terminal 100 is operating in the power saving mode, if a touch input having the same pattern of the set password is received, the controller 180 ends the power saving mode of the mobile terminal 100 and is able to control the mobile terminal 100 to be unlocked. For instance, according to the example shown in FIG. 2 (b), when the display unit 151 is turned on, the display unit 151 is released from a locked state [i.e., a home screen is outputted instead of a lock screen].

Yet, in order to prevent a touch input unintended by a user from being received, the controller 180 can determine that a touch input, which is received when a proximate object is not detected through the sensing unit 140, is valid only. For instance, although a user puts his hand in a pocket having the mobile terminal 100 kept currently therein, since an object (i.e., cloth of the pocket) proximate to the mobile terminal 100 exists, a user's touch input cannot be determined as valid. Hence, even if the user fiddles with the mobile terminal 100 in the pocket, it is able to prevent the mobile terminal 100 from being released from the power saving mode by an incorrect input.

While the mobile terminal 100 is in the power saving state, in order to receive a touch input, a touch sensor should wake up periodically and then detect whether the display unit 151 is currently touched. For instance, if a wakeup period of the touch sensor is 50 ms, the touch sensor wakes up each 50 ms and is then able to check whether the display unit 151 is touched. For clarity of the following description, the number for the touch sensor to wake up per unit time shall be named a wakeup rate or a sampling rate. For instance, if the wakeup rate is 20 Hz, it may mean that the touch sensor wakes up 20 times for 1 second. The wakeup period of the touch sensor is in inverse proportion to the wakeup rate. In particular, increasing a wakeup rate means decreasing a wakeup period of the touch sensor. Decreasing a wakeup rate may mean increasing a wakeup period of the touch sensor.

In order to reduce power consumption of the mobile terminal 100, it is preferable that the wakeup rate of the touch sensor during an operation of the mobile terminal 100 in the power saving mode is smaller than the wakeup rate of the touch sensor during an operation of the mobile terminal 100 in the normal state. This is to minimize the power amount consumed by the mobile terminal 100 in the power saving mode.

If a wakeup rate is lowered, it is possible to recognize a user's touch input correctly. This is described in detail with reference to the accompanying drawings as follows.

FIG. 3A is a diagram for one example of normally recognizing a touch input. And, FIG. 3B is a diagram for one example of misrecognizing a touch input. The axis shown in each of FIG. 3A and FIG. 3B may indicate an elapse of time. Assume that a solid line on the axis indicates that a touch sensor currently wakes up. And, assume that a dotted line on the axis indicates that the display unit 151 is currently touched with a pointer. For clarity of the following description, assume that the touch sensor maintains a sleep state and wakes up in each interval of 50 ms.

Referring to FIG. 3A (a), when a touch sensor wakes up, it is detected that the display unit 151 is currently touched. When the touch sensor wakes up next time, if it is detected that the display unit 151 is not touched, the controller 180 can determine that a touch input of touching the display unit 151 once is received.

In case that a pointer currently touching the display unit 151 maintains a touch state for a long time, referring to FIG. 3A (b), it can be detected that the display unit 151 is consecutively touched plural times. In this case, the controller 180 determines that a touch input of touching the display unit once has been received. And, the controller 180 is also able to determine that the corresponding touch input is maintained from a timing point of initially detecting that the display unit 151 was touched to a timing point of detecting that the display unit 151 is not touched.

Referring to FIG. 3B (a), after the touch sensor has woken up, if an action of touching the display unit 151 occurs until a next wakeup of the touch sensor, it is able to check whether a touch input is received despite the occurrence of the action of touching the display unit 151.

Referring to FIG. 3B (b), although an action of touching the display unit 151 twice has occurred, if a time difference between the two touch actions is small, the touch sensor may detect that the display unit 151 is touched consecutively. In this case, as mentioned in the foregoing description with reference to FIG. 3A (b), despite that the action of touching the display unit 151 has occurred twice, the controller 180 may determine that a touch input of touching the display unit once is received.

The problems mentioned in the foregoing description with reference to FIG. 3B can be solved by increasing a wakeup rate of the touch sensor. Yet, if the wakeup rate of the touch sensor is increased, an amount of power consumption of the mobile terminal 100 increases, the method of increasing the wakeup rate of the touch sensor indiscreetly may not be recommendable.

Therefore, according to the present invention, proposed is a method of increasing a wakeup rate of a touch sensor only if it is expected that a user will apply a touch input.

FIG. 4 is a flowchart for an operation of a mobile terminal according to the present invention. For clarity of the following description, assume that the mobile terminal 100 is initially in a power saving mode state (i.e., a state that the display unit 151 is turned off) and that the touch sensor operates at a $1^{st}$ wakeup rate.

Referring to FIG. 4, if a preset touch input is received through the display unit 151 [S401], the controller 180 can control a wakeup rate of a touch sensor, which is distributed on at least one partial region of a whole region of the display unit 151, to be increased to a $2^{nd}$ wakeup rate from a $1^{st}$ wakeup rate [S402]. Hence, touch misrecognition in a wakeup rate increased region can be reduced.

If the touch sensor wakeup rate for the at least one partial region of the display unit 151 is increased from the $1^{st}$ wakeup rate to the $2^{nd}$ wakeup rate, the controller 180 can control the touch sensor wakeup rate for a remaining region of the display unit 151 to maintain the $1^{st}$ wakeup rate or a wakeup rate lower than the $1^{st}$ wakeup rate. For another instance, the controller 180 may control the touch sensor for the remaining region of the display unit 151 to maintain a deactivated state. For instance, FIG. 5 is a diagram for one example of increasing a wakeup rate of a touch sensor distributed on at least one partial region of a whole region of the display unit 151 according to one embodiment of the present invention.

While the touch sensor is operating at a $1^{st}$ wakeup rate, a preset touch input may be received through the display unit 151. In this case, the preset touch input may include one of touch inputs of various types such as a touch input of touching the display unit 151 over a prescribed time, a touch input of touching the display unit 151 with a plurality of pointers, touch inputs applied consecutively in a preset time, a $1^{st}$ touch input among touch inputs consecutively received in a preset time, a $1^{st}$ touch drag input among touch inputs consecutively received in a preset time, and the like.

Moreover, the preset touch input may include an advance input separate from an input for cancelling a power saving mode like the example shown in FIG. 2. For instance, the preset touch input may include a separate advance input that is applied before a touch input (e.g., a touch input corresponding to the circle 1 and the circle 2) shown in FIG. 2 (a) or a touch input (e.g., a touch input corresponding to the circles 1 to 4) shown in FIG. 2 (b).

The preset touch input may be received in a random region of the display unit 151. The preset touch input may be received in a preset region only.

Once the preset touch input is received, the controller 180 can increase the wakeup rate of the touch sensor distributed on the at least one partial region of the whole region of the display unit 151 to the $2^{nd}$ wakeup rate. For instance, referring to FIG. 5, the region in which the wakeup rate of the touch sensor is increased is denoted by a dotted line. As the wakeup rate of the touch sensor for the at least one partial region of the display unit 151 is increased, touch recognition accuracy in the corresponding region can be further increased.

If the wakeup rate of the touch sensor for the at least one partial region of the display unit 151 is increased from the $1^{st}$ wakeup rate to the $2^{nd}$ wakeup rate, the controller 180 controls the wakeup rate of the touch sensor for the remaining region to maintain the $1^{st}$ wakeup rate or to be decreased to a wakeup rate lower than the $1^{st}$ wakeup rate, or may control the touch sensor for the remaining region to maintain a deactivated state. In doing so, the controller 180 may be able to determine whether to control the wakeup rate for the remaining region to maintain the $1^{st}$ wakeup rate, whether to control the wakeup rate of the touch sensor for the remaining region to be decreased to a wakeup rate lower than the $1^{st}$ wakeup rate, or whether to deactivate the wakeup rate of the touch sensor for the remaining region, depending on a type of the preset touch input. For instance, if a preset touch input is inputted through an outside of a preset region, the controller 180 controls the wakeup rate of the touch sensor for the remaining region to maintain the $1^{st}$ wakeup rate. If a preset touch input is inputted through an inside of a preset region, the controller 180 may control the wakeup rate of the touch sensor for the remaining region to be decreased to a wakeup rate lower than the $1^{st}$ wakeup rate or may be able to deactivate the touch sensor for the remaining region.

After the wakeup rate for the at least one partial region of the display unit 151 has been increased, like the example shown in FIG. 2, if a user input for cancelling the power saving mode of the mobile terminal 100 is received, the controller 180 can control the power saving mode of the mobile terminal 100 to be cancelled.

In doing so, a preset user input for increasing the wakeup rate of the touch sensor is preferably inputted ahead of the touch input for cancelling the power saving mode of the mobile terminal 100. In this case, since the touch input for cancelling the power saving mode of the mobile terminal 100 will be inputted in a state that the wakeup rate of the touch sensor has been increased, it is able to reduce a misrecognition error of the touch input for cancelling the power saving mode.

The preset touch input may include a partial input of the input for cancelling the power saving mode of the mobile terminal 100. For instance, a $1^{st}$ touch input among a plurality of touch inputs for cancelling the power saving mode of the mobile terminal 100 can be defined as a preset user input for increasing the wakeup rate of the mobile terminal 100. According to the description of the example with reference to FIG. 2, an input corresponding to the circle 1 shown in FIG. 2 (a) or an input corresponding to the circle 1 shown in FIG. 2 (b) may correspond to the preset touch input.

If the wakeup rate of the touch sensor corresponding to at least one partial region of the display unit 151 is increased to the $2^{nd}$ wakeup rate by the $1^{st}$ touch input (e.g., the input corresponding to the circle 1 shown in FIG. 2 (a), the input corresponding to the circle 1 shown in FIG. 2 (b), etc.) among the touch inputs for cancelling the power saving mode, it is able to raise the recognition rate of the rest of the touch inputs (e.g., the circle 2 shown in FIG. 2 (a), the input corresponding to the circle 2, the circle 3 and the circle 4 shown in FIG. 2 (b), etc.) for cancelling the power saving mode. Thus, if the $1^{st}$ touch input is normally recognized, it may be able to reduce the recognition error of the following touch inputs.

Only if the display unit 151 is being touched with a pointer, the controller 180 may increase a wakeup rate of a touch sensor distributed in at least one partial region of a whole region of the display unit 151.

For instance, FIG. 6 is a diagram for another example of increasing a wakeup rate of a touch sensor distributed on at least one partial region of a whole region of the display unit 151 according to one embodiment of the present invention.

Referring to FIG. 6, after the display unit 151 has been touched with a pointer, if the display unit 151 keeps being touched with the pointer despite expiration of a prescribed time, the controller 180 may control a wakeup rate of a touch sensor for at least one partial region of the display unit to be increased (i.e., increased from a $1^{st}$ wakeup rate to a $2^{nd}$ wakeup rate). In FIG. 6, a touch sensor wakeup rate increased region is denoted by a dotted line.

While the display unit 151 is touched with the pointer, the controller 180 may control the touch sensor for the at least one partial region of the display unit 151 to maintain the $2^{nd}$ wakeup rate. Thereafter, if the touch to the display unit 151 is cancelled, like the example shown in FIG. 6, the controller 180 may control the wakeup rate of the corresponding region to be decreased to the $1^{st}$ wakeup rate again.

A preset user input for increasing a wakeup rate of a touch sensor should be received ahead of a touch input for cancelling a power saving mode of the mobile terminal 100. Yet, it is not necessary for the preset user input to be ended ahead of the input for cancelling the power saving mode. In particular, while the preset user input is maintained, an input for cancelling the power saving mode may be separately received. While the preset touch input is maintained, if the user input for cancelling the power mode of the mobile terminal 100 is received, a touch input for cancelling the power saving mode of the mobile terminal 100 is recognized in a state that a wakeup rate of a touch sensor has been increased. Hence, it may be able to reduce the recognition error of the touch input for cancelling the power saving mode.

The controller 180 may be able to determine a region for increasing a wakeup rate based on a touch input (i.e., a preset touch input) of triggering a wakeup rate increase or may be able to determine a region for increasing a wakeup rate by a pre-saved setting value.

For instance, FIGS. 7A to 7C are diagrams for examples of determining a region for increasing a wakeup rate according to one embodiment of the present invention.

First of all, when the display unit 151 is partitioned in to a left region and a right region or a top region and a bottom region, the controller 180 can control a wakeup rate of a region, to which a touch input for triggering an increase of a wakeup rate of a touch sensor is applied, or a wakeup rate of a region opposite to the touch input applied region to be increased.

For example, referring to FIG. 7A (a), if a touch input for triggering a wakeup rate increase of a touch sensor is received through a left region of the display unit 151, the controller 180 may control a wakeup rate for a right region of the display unit 151 to be increased.

For another example, referring to FIG. 7A (b), if a touch input for triggering a wakeup rate increase of a touch sensor is received through a bottom region of the display unit 151, the controller 180 may control a wakeup rate for a top region of the display unit 151 to be increased.

According to the examples shown in FIG. 7A (a) and FIG. 7A (b), in response to the touch input for triggering the wakeup rate increase of the touch sensor, the wakeup rate of the side opposite to the touch input received region is increased. Unlike the illustrated examples, in response to a touch input, a wakeup rate of a touch input received region can be set to be increased.

Unlike the example shown in FIG. 7A, the controller 180 may be able to increase a wakeup rate of a region located in a preset direction from a touch input for triggering a wakeup rate increase of a touch sensor. For instance, if a preset direction is a right top direction, like the example shown in FIG. 7B, the controller 180 may be able to control a wakeup rate of a region located in a right top direction from a touch inputted location. According to the example shown in FIG. 7B, the right top is taken as an example of the preset direction. Yet, it is a matter of course that the preset direction can be set to a direction unlike the illustrated example or a plurality of directions.

Based on a pre-saved setting value, the controller 180 may determine a region for increasing a wakeup rate. In this case, the pre-saved setting value may be changed by a user. FIG. 7C shows one example of a user interface provided to a user to determine a region for increasing a wakeup rate. Referring to FIG. 7C, if a user selects a prescribed item from an item list shown in FIG. 7C, the controller 180 can determine a region for increasing a wakeup rate based on the item selected by the user. A $1^{st}$ item 710 in the list shown in FIG. 7C may be provided to set two corners of each of top and bottom parts of the display unit 151 as regions for increasing a wakeup rate. A $2^{nd}$ item 720 in the list shown in FIG. 7C may be provided to set four corners of the display unit 151 as regions for increasing a wakeup rate. A $3^{rd}$ item 730 in the list shown in FIG. 7C may be provided to set a left top region of the display unit 151 as a region for increasing a wakeup rate. And, a 4th item 740 in the list shown in FIG. 7C may be provided to set a central part and four corners of the display unit 151 as regions for increasing a wakeup rate.

If a wakeup rate of a touch sensor for a partial region of the display unit 151 is increased, the controller 180 may determine that a touch input to the wakeup rate increased partial region is valid only. While the controller 180 ignores a touch input to a remaining region of the display unit 151 except the wakeup rate increased partial region, if a touch input to the wakeup rate increased partial region is received, the controller 180 can control a power saving mode of the display unit 151 to be cancelled in response to the received touch input.

In doing so, while a wakeup rate of the touch sensor for at least one partial region of the display unit 151 is increased to a $2^{nd}$ wakeup rate, a wakeup rate of the touch sensor for the remaining region can maintain a $1^{st}$ wakeup rate. For another instance, while a wakeup rate of the touch sensor for at least one partial region of the display unit 151 is increased to a $2^{nd}$ wakeup rate, the touch sensor for the remaining region may enter a deactivated state. In this case, the controller 180 may be able to receive a touch input through a wakeup rate increased region only.

If a preset touch input is received, the controller 180 increases a wakeup rate of the touch sensor for a partial region of the display unit 151 and turns on the display unit 151 to control a wakeup rate increased region to be identifiably displayed.

For instance, FIG. 8 is a diagram for one example of identifiably displaying a wakeup rate increased region according to one embodiment of the present invention.

Referring to FIG. 8, if a preset touch input is received, the controller 180 turns on the display unit 151 and controls a wakeup rate increased region to be identifiably displayed. For example, referring to FIG. 8 (*a*), the controller 180 may display an outline 810 of a wakeup rate increased region. Referring to FIG. 8 (*b*), the controller 180 may control a horizontal line 812 and a vertical line 814 to be displayed. In this case, the horizontal line 812 partitions the wakeup rate increased region into two parts (i.e., a top part and a bottom part). And, the vertical line 814 partitions the wakeup rate increased region into two parts (i.e., a left part and a right part).

According to the examples shown in FIGS. 6 to 8, if a preset touch input is received, a wakeup rate of a touch sensor for a partial region of the display unit 151 is increased. Unlike the illustrated examples, in response to a preset touch input, the controller 180 may control a wakeup rate of a touch sensor for a while region of the display unit 151 to be increased.

After the wakeup rate has been increased, if a touch input for cancelling a power saving mode of the mobile terminal 100 is received, the controller 180 cancels the power saving mode of the mobile terminal 100 and is able to turn on the display unit 151 (cf. FIG. 2A and FIG. 2B).

After the wakeup rate has been increased, if any touch input is not received despite expiration of a prescribed time [S403], the controller 180 can control the wakeup rate of the touch sensor for the at least one partial region to be decreased to the $1^{st}$ wakeup rate again [S404]. By controlling the wakeup rate to be automatically decreased after an elapse of a prescribed time, it is able to reduce power consumption of the mobile terminal 100.

According to the example shown in FIG. 4, a wakeup rate of a touch sensor for at least one partial region of the display unit 151 is increased only if a preset touch input is received. According to the example shown in FIG. 4, a preset touch input includes a long touch to the display unit or a touch to the display unit 151 with a plurality of pointers. And, it is a matter of course that a wakeup rate of a touch sensor for at least one partial region of the display unit 151 can be increased by a touch input of a type different from those shown in the examples.

For example, in case that a touch input of sweeping down the display unit 151 with a palm is received, the controller 180 can control a wakeup rate of a touch sensor for at least one partial region of the display unit 151 to be increased to a $2^{nd}$ wakeup rate.

For instance, FIG. 9 is a diagram for further example of increasing a wakeup rate of a touch sensor distributed on at least one partial region of a full region of the display unit 151 according to one embodiment of the present invention. If a touch input of sweeping down the display unit 151 with a palm is received, the controller 180 may control a wakeup rate of a touch sensor for at least one partial region of the display unit 151 to be increased.

Referring to FIG. 9, the controller 180 can control a wakeup rate to be increased for a touch sensor of a region swept by a palm only.

Alternatively, the controller 180 may control a wakeup rate to be increased for a touch sensor of a region failing to be swept by a palm only.

Unlike the examples mentioned in the above description, if it is detected that a mobile terminal placed situation is changed through the sensing unit 140 or if a gesture input is received, the controller 180 can control a wakeup rate of a touch sensor for at least one partial region of the display unit 151 to be increased.

FIG. 10 is a diagram for one example of increasing a wakeup rate of a touch sensor distributed on at least one partial region of a full region of the display unit 151 in response to a gesture input according to one embodiment of the present invention.

Referring to FIG. 10 (a), if a gesture input of shaking the mobile terminal 100 in right and left directions is detected, the controller 180 can control a wakeup rate of a touch sensor for at least one partial region of the display unit 151 to be increased.

Referring to FIG. 10 (b), if a gesture input of standing the mobile terminal 100 placed on a floor is detected, the controller 180 can control a wakeup rate of a touch sensor for at least one partial region of the display unit 151 to be increased.

The controller 180 may be able to check whether a gesture input is received through the sensing unit 140 (e.g., a gyro sensor, an acceleration sensor, etc.).

If the mobile terminal 100 is taken out of a dark place to a bright place, the controller 180 can control a wakeup rate of a touch sensor for at least one partial region of the display unit 151 to be increased.

For instance, FIG. 11 is a diagram for one example of increasing a wakeup rate of a touch sensor for at least one partial region of the display unit 151 in case of taking the mobile terminal 100 out of a dark place to a bright place according to one embodiment of the present invention. Referring to FIG. 11, if the mobile terminal 100 is taken out of a dark place (e.g., a pocket, etc.) to a bright place, the controller 180 can control a wakeup rate of a touch sensor for at least one partial region of the display unit 151 to be increased.

In doing so, the controller 180 may be able to check whether the mobile terminal 100 is placed in a dark place or a bright place through the sensing unit 140 (e.g., an illumination sensor, etc.).

When the mobile terminal 100 is blocked by a prescribed object, if the object currently blocking the mobile terminal 100 is removed, the controller 180 can control a wakeup rate of a touch sensor for at least one partial region of the display unit 151 to be increased.

For instance, FIG. 12 is a diagram for one example of increasing a wakeup rate of a touch sensor for at least one partial region of the display unit 151 in case of disappearance of an object proximate to the mobile terminal 100 according to one embodiment of the present invention. Referring to FIG. 12, when the display unit 151 is placed toward a floor, the mobile terminal 100 is blocked by the floor. If a user picks up the mobile terminal 100 currently placed on the floor, the mobile terminal 100 is no longer blocked by the floor.

If so, like the example shown in FIG. 12, the controller 180 can control a wakeup rate of a touch sensor for at least one partial region of the display unit 151 to be increased.

It will be appreciated by those skilled in the art that the present invention can be specified into other form(s) without departing from the spirit or scope of the inventions.

According to one embodiment of the present invention, the above-described method (e.g., a flowchart of operation) can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet). Further, the processor may include the controller 180 of the mobile terminal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

The present invention is applicable to various electronic devices such as a fixed terminal having a touchscreen and the like as well as to a mobile terminal.

The invention claimed is:

1. A mobile terminal comprising:
   a display unit turned off in a power saving mode and turned on in a normal mode;
   a plurality of touch sensors configured to detect a touch input applied to the display unit by periodically waking up during the power save mode, a period between waking up the touch sensors being a wakeup period; and
   a controller configured to:
   detect a first touch input to the display unit during the power saving mode,
   determine a region located in a prescribed direction from the first touch input as a first partial region of the display unit,
   decrease the wakeup period of first touch sensors layered with the first partial region in response to the first touch input,
   maintain or increase the wakeup period of second touch sensors layered with a second partial region which is a remaining region of the display unit except for the first partial region when the wakeup period of the first touch sensors is decreased, and
   change the power saving mode to the normal mode in response to detecting a second touch input at the first partial region.

2. The mobile terminal of claim 1, wherein if the second touch input is not detected at an expiration of a prescribed time after the wakeup period has been decreased, the controller is configured to reset the wakeup period of the first touch sensors to an original state.

3. The mobile terminal of claim 1, wherein the controller is configured to maintain the decreased wakeup period of the first touch sensors when the first touch input is being maintained on the display unit.

4. The mobile terminal of claim 3, wherein if the first touch input is ended, the controller is configured to reset the wakeup period of the first touch sensors to an original state.

5. The mobile terminal of claim 1, wherein if the second touch input is received, the controller is configured to turn on the display unit and control the display unit to display information for visually identifying the first partial region.

6. The mobile terminal of claim 1, wherein the first touch input is applied before the second touch input for changing the power saving mode to the normal mode of the mobile terminal.

7. The mobile terminal of claim 1, wherein the first touch input comprises a portion of a touch input for cancelling the power saving mode of the mobile terminal.

8. A method of controlling a mobile terminal, the method comprising:
   detecting a first touch input to a display unit through a plurality of touch sensors during a power saving mode;
   determining a region located in a prescribed direction from the first touch input as a first partial region of the display unit;
   decreasing a wakeup period of first touch sensors layered with the first partial region of the display unit in response to the first touch input, the wakeup period being a period between waking up the touch sensors;
   maintaining or increasing the wakeup period of second touch sensors layered with a second partial region which is remaining region of the display unit except for the first partial region when the wakeup period of the first touch sensors is decreased; and
   changing the power saving mode to a normal mode in response to detecting a second touch input at the first partial region,
   wherein the display unit is turned off in the power saving mode and is turned on in the normal mode.

* * * * *